United States Patent [19]

Besecke et al.

[11] Patent Number: 4,492,805
[45] Date of Patent: Jan. 8, 1985

[54] POLYARYLENE ETHERS CONTAINING PHOSPHORUS

[75] Inventors: Siegmund Besecke, Seeheim-Jugenheim; Günter Schröder, Ober-Ramstadt; Werner Ude, Darmstadt-Arheilgen; Winfried Wunderlich, Rossdorf, all of Fed. Rep. of Germany

[73] Assignee: Röhm GmbH, Darmstadt, Fed. Rep. of Germany

[21] Appl. No.: 461,037

[22] Filed: Jan. 26, 1983

[30] Foreign Application Priority Data

Jan. 30, 1982 [DE] Fed. Rep. of Germany ....... 3203186

[51] Int. Cl.$^3$ .............................. C07F 9/50; C07F 9/53
[52] U.S. Cl. ..................................... 568/012; 568/15; 568/21; 260/932; 528/169
[58] Field of Search ........................... 568/15, 12, 21; 260/932; 528/169

[56] References Cited

U.S. PATENT DOCUMENTS 3,594,446 7/1971 Gabler et al. ...................... 528/159
4,328,174 5/1982 Schmidt et al. .................... 260/930

OTHER PUBLICATIONS

Hashimoto et al., J. of Macromol. Sci. Chem. A., 11, (12), 2167–2176, (1977).

*Primary Examiner*—Anton H. Sutto
*Attorney, Agent, or Firm*—Curtis, Morris & Safford

[57] ABSTRACT

Difficultly flammable polyarylene ether resins containing phosphorus having the structure

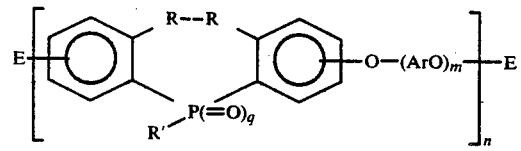

and methods for making the same.

13 Claims, No Drawings

POLYARYLENE ETHERS CONTAINING PHOSPHORUS

The present invention relates to difficultly flammable polyarylene ethers having a very high decomposition temperature and a glass transition temperature ranging from 100° C. to 300° C., and to a process for making the same.

Published German patent application No. 29 25 206 teaches polyester phosphonates having molecular weights ranging from 11,000 to 200,000 and comprising mixed polyesters of an aromatic diol, an aromatic dicarboxylic acid, and a phosphonic acid. They have a decomposition temperature of over 300° C. and range from difficultly flammable to nonflammable. They are partially hydrolyzed at high temperature by water or alkalis and are thus dissociated into oligomers. This sensitivity to hydrolysis limits the potential uses of these polymers.

Phosphorus-containing aromatic polyethers prepared by the polycondensation of bis-(para-chlorophenyl)-phenylphosphine oxide with aromatic diols in the presence of an alkali are known from an article by S. Hashimoto et al., Journal of Macromol. Sci. Chem. A 11 (12), 2167-2176 (1977). The polyethers there described have a relatively low molecular weight and a reduced viscosity, $\eta_{sp}/c$, of 0.15 dl/g or less. They are formed partly of brown, viscous oils and partly of rubberlike masses or friable powders. Sintering of the solid reaction products results in bodies of low strength which have none of the properties of synthetic resins.

The object of the present invention is to improve the resistance to hydrolysis and weathering of the prior art difficultly flammable polycondensates containing phosphorus and to increase their thermal stability. A feature of the invention are polyarylene ether polymers according to the invention which differ from the compounds described by Hashimoto et al. in that they have a larger reduced viscosity, i.e. a higher molecular weight. Surprisingly, they are materials possessing considerable strength and the typical properties of plastics.

The new materials can be molded at high temperature or can be thermoformed in the thermoplastic state into shaped articles of all kinds. In particular, they are processed into foils and fibers. These can be further shaped into three dimensional articles while in the thermoplastic state.

The new materials are suited for end uses requiring the typical properties of plastics, such as low weight, high impact strength, and high flexibility, and where at the same time complete or almost complete nonflammability and extremely high thermal stability are required.

The new materials differ from prior art polyarylene ethers containing phosphorus in that they have the properties of true synthetic resins, which properties render them suitable for use as engineering materials. They possess higher resistance to hydrolysis and higher thermal stability than do prior art materials comprising polyester phosphonates. Thermogravimetric analyses and differential scanning calorimetry (DSC) measurements both show that the decomposition temperature is about 500° C.

It has been found that the new polyarylene ethers containing phosphorus exhibit the desired properties of synthetic resins only when they have a reduced viscosity of at least 0.25 dl/g. Preferably, the reduced viscosity is greater than 0.3 dl/g and still more preferably is in the range from 0.4 to 2 dl/g. These reduced viscosity ranges correspond to molecular weights of at least 10,000, and preferably from 15,000 to 500,000.

These compounds are difficultly flammable or nonflammable if they have a phosphorus content of at least 2 weight percent. The phosphorus content preferably ranges from 4 to 11 percent. Their flammability is reduced further if the composition of the polyethers includes chlorinated or brominated aromatic hydrocarbon compounds.

It has been found that polyarylene ethers containing phosphorus having the requisite minimum value of reduced viscosity can be prepared by the polycondensation of a difunctional phosphine or phosphine oxide of the following formula I with a difunctional aromatic compound of following formula II if half of the functional groups, X, are fluorine atoms and the other half are hydroxyl groups. Polycondensation probably proceeds such that the aromatic hydroxyl groups first react with an equivalent amount of alkali to give the corresponding alkali metal salt. These groups then react with the fluorinated compound with elimination of an alkali metal fluoride in according to the following schematized formulas.

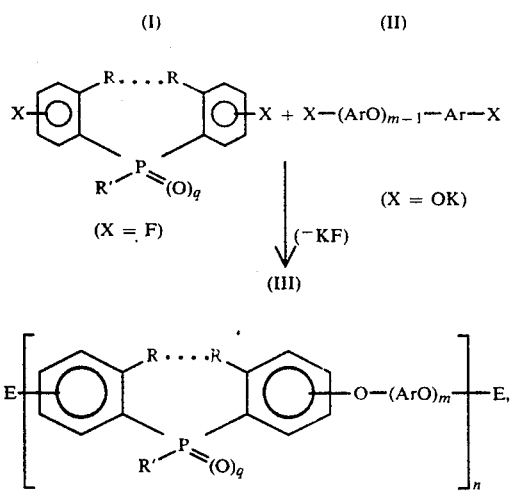

wherein
Ar is phenylene, naphthalene, or

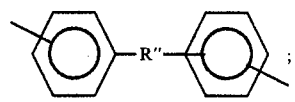

R taken alone, is hydrogen; adjacent R's, taken pairwise, are an oxygen atom or are R'';

R' is alkyl, chloromethyl, aryl, alkoxy, or aryloxy;

R'' is a covalent bond, a sulfur atom, or a sulfonyl, carbonyl, methylene, or isopropylidene bridging group;

E are the same or different terminal groups which are hydrogen, halogen, alkyl, aryl, alkoxy, alkoyl, or oxyalkoyl;

m has an average value from 0 to 10;

q is 0 or 1; and n is a number corresponding to the degree of polycondensation of the polyarylene ether obtained, i.e. has an average value of at least 10. The product has a reduced viscosity, $\eta_{sp}/c$ equal to or greater than 0.25 dl/g.

A phosphine or phosphine oxide (I) wherein X is OH and a compound (II) wherein X is F may be reacted in analogous fashion. When a strictly alternating structure built up from units corresponding to (I) and (II) is desired, symmetrical compounds (I) and (II) are used in which the X groups are the same; in other words, a difluoride is reacted with a diol. Asymmetrical compounds (IV) and (V) below could be co-condensed statistically and, depending on the reactivity of the functional groups, in a more or less broad chemical distribution:

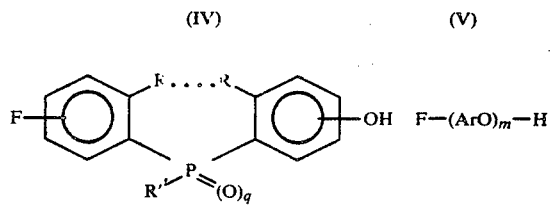

Product (III) wherein m is 0 is obtainable by polycondensation of (IV) alone or by reaction of (I) (X=F) with (I) (X=OH).

The reaction is appropriately carried out at an elevated temperature in a suitable solvent. The solvent should preferably dissolve both of the starting materials and the corresponding polycondensate, whereas the alkali metal fluoride should remain undissolved. The latter can then be removed from the reaction solution by filtration or centrifugation.

Examples of suitable solvents are chlorobenzene and N-methylpyrrolidone. The condensation can be carried out at a temperature from 100° to 300° C., and preferably from 120° to 200° C. The condensation conditions are maintained until the requisite minimum reduced viscosity value is attained as condensation proceeds. This calls for a very high degree of conversion. As a rule, nearly complete conversion of the functional groups is desired. This requires reaction times from 2 to 10 hours, and occasionally of over 10 hours.

In order that the desired degree of polycondensation n may be attained, it is necessary that the fluorine atoms and the hydroxyl groups be present in the starting mixture in a stoichiometric ratio of exactly 1:1, while the alkali may be used in limited excess. Moreover, the difunctional starting materials should be of high purity. Secondary constituents which might enter into the condensation reaction but are not difunctional should be less than 0.1 weight percent, and preferably less than 0.01 weight percent, of the starting materials (I) and (II).

When the starting materials (I) and (II) are symmetrical, they may be used in any desired mixing ratio, provided that the condition is satisfied that the functional fluorine atoms and hydroxyl groups are present in equivalent numbers.

For example, the difluorine component may be formed of several compounds, some of which may have the structure (I) while others have the structure (II). The same applies to the dihydroxy component. When only components of structure (I) are used, then m will have the value 0 in the end product of formula (III). When the components of structure (I) predominate stoichiometrically, m has an average value between 0 and 1. If, on the other hand, the components of structure (II) predominate, the average value of m will be over 1 and may be as high as 10. With values over 10, the influence of the units having the structure (I) would be too slight and the desired advantageous properties would not be fully obtained.

All strongly basic alkali compounds which bind the hydrogen fluoride which is split off during the condensation in the form of an alkali metal fluoride are suitable condensing agents. For example, alkali metal oxides, hydroxides, or carbonates are suitable. Sodium or potassium compounds, and especially their carbonates, are preferred. This component should be used in as finely divided form as is possible.

During the condensation, solid alkali metal fluoride is precipitated. This is removed from the solution of the polyether by filtration. The polycondensate can then be recovered in pure form by distilling off the solvent.

Symmetrical compounds (I) and (II) are preferably used in a stoichiometric ratio of exactly 1:1, and in particular compounds (I) wherein X is F and compounds (II) wherein X is OH. Strictly alternating products (III) are thus obtained wherein m as a rule has a value of 1. However, m may also have a uniform or average value greater than 1 if an appropriate starting compound such as an oligomeric polyphenylene oxide is used. It is possible to deviate from this composition as desired and to prepare condensation products (III) wherein units of structure (I) or units of structure (II) predominate. This can be accomplished by the co-condensation of unsymmetrical starting materials (IV) and (V) for example, in the desired mixing ratio.

Among the starting materials (I) containing phosphorus, derivatives of methyl diphenyl phosphine, and particularly of triphenyl phosphine, are preferred, in other words compounds wherein R' is methyl or phenyl. Compounds (I) wherein R' is alkyl other than methyl or aryl other than phenyl, or is alkoxy (and in particular one having from 1 to 4 carbon atoms), or aryloxy (and in particular phenyloxy), or chloromethyl, may be used but are less readily obtainable industrially. The phenyl groups in the main chain may be linked in the ortho positions by a bridge which is symbolized by R———R in formula (I). The R———R bridge may be formed by any of the members named under R'', including a single bond between the two ortho carbon atoms of the phenyl groups. If R———R is a single bond, the phosphorus atom is located in a five-membered ring between the phenyl groups. In all other cases in which R———R has one of the meanings given under R'', the ortho carbon atoms are connected through a single-membered bridge which, together with the phenyl groups and the phosphorus atom, forms a six-membered ring. A single bond or an oxygen atom is the preferred R———R bridge, but the latter may also be a sulfonyl (=SO$_2$), carbonyl, methylene, or isopropylidene group. Starting compounds (I) in which there is no bridge and R is a hydrogen atom are particularly preferred.

Phosphine oxides wherein q is 1 are generally preferred to phosphines wherein q is 0. The latter may be prepared from the correponding phosphine oxides by reduction. This is true particularly of compounds wherein R' is methyl or phenyl and R is hydrogen.

The X groups, and particularly the F atoms, are preferably in a position para to the carbon atoms which is attached to the phosphorus atom. The preferred representatives of compound (I) are di(4-fluorophenyl)-phenylphosphine oxide and di(4-fluorophenyl)-methylphosphine oxide.

In the difunctional aromatic compound represented by the formula X—(Ar-O)$_{m-1}$—Ar—X (II), Ar may be a divalent arylene group, for example a para-phenylene, meta-phenylene, 1,4-naphthalene, or 1,5-naphthalene group. In compounds wherein m is greater than 1, Ar may be a para-phenylene group in particular, X being OH. (II) then is an oligomeric polyphenyl oxide or a corresponding mixture of oligomers. In the latter case, m represents the average value of the degree of oligomerization. Di(para-hydroxyphenyl) ether is particularly preferred. Ar may also be a structure of the formula

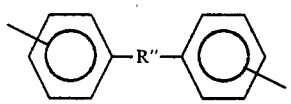

In that case, suitable compounds (II) are primarily those wherein m is 1, the free valences preferably being in a position para to R''. In the simplest case, R'' represents a covalent single bond between the phenyl groups. Other possible meanings of R'' are, for example, sulfide and sulfonyl, and especially carbonyl, methylene, and isopropylidene.

Examples of symmetrical compounds of the (II) type wherein X is OH are hydroquinone, resorcinol, 1,4-dihydroxynaphthalene, 1,5-dihydroxynaphthalene, 4,4'-dioxydiphenyl, phenolphthalein, and the compounds known as bisphenol A and F. Examples of compounds wherein X is F are 4,4'-difluorobenzophenone, bis(4-fluorophenyl)sulfone, and 4,4'-difluorodiphenyl ether.

The terminal groups may be unreacted fluorine atoms or hydroxyl groups. The latter have an adverse effect on the properties of the polyarylene ethers and therefore are preferably etherified with methyl chloride. In lieu thereof, other alkylating, arylating, or acylating agents may be used.

The following examples illustrate preferred methods for making polyarylene ethers containing phosphorus in accordance with the invention.

EXAMPLES 1 TO 6

0.1 mol of the appropriate arylene diol, 0.1 mol of di(para-fluorophenyl)phenylphosphine oxide, and 0.105 mol of anhydrous potassium carbonate were dissolved in 150 g of N-methylpyrrolidone and 50 g of chlorobenzene. The solution was heated to 180° C. under an argon atmosphere and an azeotropic mixture of water of reaction and chlorobenzene was removed. At the same time, carbon dioxide escaped. Toward the end of the elimination of water after about 2 hours at reaction temperature, another 50 g of chlorobenzene were added dropwise within an hour for removal of the residual water. Final condensation then took place over a period from 5 to 10 hours at 180° to 200° C. under an argon atmosphere. Condensation was terminated by the introduction of methyl chloride for 30 minutes at 160° C. to 180° C. After cooling, the viscous reaction mixtures were diluted with tetrahydrofuran, the inorganic precipitate was filtered off, and the polyether in the filtrate was precipitated with a methanol/water mixture. Ultimate analysis of the polycondensates dried at 100° C. to constant weight yielded data which were in good agreement with the calculated theoretical values.

TABLE

| Example | Arylene Diol | $T_g$ by DSC[1] (°C.) | $T_d$ TGA[2] (°C.) | CR Value[3] (%) | P content (% of theory) | Reduced viscosity $\eta_{sp}/c$[4] (dl/g) |
|---|---|---|---|---|---|---|
| 1 | Hydroquinone | 185 | >450 | 31.7 | 8.07 | 0.28 |
| 2 | 4,4'-Dioxydiphenyl | 155 | >450 | 37.9 | 6.74 | 0.41 |
| 3 | 1,5-Dioxynaphthalene |  | >450 | 36.2 | 7.14 | 0.33 |
| 4 | 4,4'-Dioxydiphenyl ether | 170 | 490 | 32.8 | 6.51 | 0.32 |
| 5 | Bisphenol A | 180 | >450 | 24.9 | 6.18 | 0.37 |
| 6 | 4,4'-Dioxytriphenylphosphine oxide | 215 | >450 | 40.8 | 10.62 | 0.31 |

[1]Glass transition temperature as determined by differential scanning calorimetry
[2]Onset of decomposition as determined by thermogravimetric analysis ($N_2$)
[3]Pyrolysis residue after 30 min. at 800° C. under $N_2$
[4]c = 0.5 g/100 ml meta-cresol at 30° C.

EXAMPLE 7

0.05 mol of di(para-hydroxyphenyl)phenylphosphine oxide was reacted with 0.05 mol of 4,4'-difluorobenzophenone in the presence of 0.0525 mol of potassium carbonate under the preparation conditions used in Examples 1 to 6 (10 hours reaction time at 180° C. to 200° C.). The polyether so obtained gave solid, flexible, transparent cast sheets (from chloroform) and compression molded chips. It had a reduced viscosity of 0.47 dl/g.

EXAMPLE 8

0.1 mol of di(para-fluorophenyl)phenylphosphine oxide was reacted with 0.1 mol of 4,4'-dihydroxy-diphenylsulfone in the presence of 0.105 mol of potassium carbonate under the preparation conditions used in Examples 1 to 6 (10 hours reaction time at 180° C. to 200° C.). The polyether so obtained showed the following properties:

$T_g > 150°$ C.; $T_d > 450°$ C.; CR-Value$=34\%$ $\eta_{sp}/C=0.4$ dl/g and gave solid, flexible, transparent cast sheets.

EXAMPLE 9

0.04 mol of 4-fluoro-4'-hydroxybenzophenone and 0.02 mol of di(para-hydroxyphenyl)phenylphosphine oxide were reacted with 0.02 mol of di(para-fluorophenyl)phenylphosphine oxide in the presence of 0.042 mol of potassium carbonate under the preparation conditions used in Examples 1 to 6 (180° C. to 200° C.). The polyether so obtained was crystalline (melting point $T_m=200°$ C.) and had $\eta_{sp}/C=0.32$ dl/g, $T_d>400°$ C., CR-Value$=38\%$ and a molecular weight of 18,000. The random distribution of benzophenone units within the polyether main-chain was verified by IR-spectroscopic data, showing typical absorption peaks at 1650 cm$^{-1}$ and 920 cm$^{-1}$ and by elemental analysis:

|  | C[%] | H[%] | P[%] |
|---|---|---|---|
| calculated | 75.4 | 4.4 | 7.9 |

| | C[%] | H[%] | P[%] |
|---|---|---|---|
| found | 74.9 | 4.6 | 6.9 |

EXAMPLE 10

0.02 mol of 3,7-difluoro-10-phenylphenoxaphosphine-10-oxide was reacted with 0.02 mol of 4,4'-dihydroxy-diphenylether in the presence of 0.021 mol of potassium carbonate under the preparation conditions used in Examples 1 to 6 (180° C. to 200° C.). The polyether so obtained had a reduced viscosity $\eta_{sp}/C=0.33$ dl/g and a phosphorus content of 5.9% (calculated value: 6.4%).

EXAMPLES 11 TO 12

0.1 mol of 4,4'-difluoro-benzophenone was reacted with 0.1 mol each of two phosphorus compounds shown in the table below, respectively, in the presence of 0.11 mol of potassium carbonate under the preparation conditions used in Examples 1 to 6 (180° C. to 200° C.). The resulting polyethers were isolated from the reaction mixture by precipitation with ethanol or with light petroleum.

| Example No. | phosphorus compound | P—content of the polyether [%] calc. | found | intrinsic viscosity $\eta_{sp}/C$ [dl/g] |
|---|---|---|---|---|
| 11 | 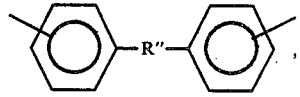 | 7.28 | 6.8 | 0.45 |
| 12 | 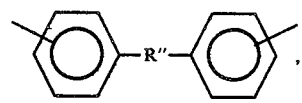 | 6.38 | 5.8 | 0.36 |

EXAMPLE 13

0.05 mol of di(para-fluorophenyl)phenylphosphine oxide was reacted with 0.05 mol of phenolphthalein in the presence of 0.053 mol of potassium carbonate under the reaction conditions described in Examples 1 to 6 (5 hours; 180° C. to 190° C.). The isolated polyether had the following properties:

$T_g=260°$ C.; $T_d>450°$ C.; CR-Value=55%; $\eta_{sp}/C=0.56$ dl/g and gave clear, transparent cast sheets.

What is claimed is:

1. A polyarylene ether containing phosphorus and consisting of recurring units having the structure

wherein
m has an average value between 0 and 10;
q is 0 or 1;
R' is methyl or phenyl;
R, taken alone, is hydrogen, or adjacent R's taken pairwise are oxygen or R'';
Ar is phenylene, naphthalene, or

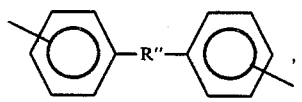

wherein
R'' is a covalent single bond, sulfur, sulfonyl, carbonyl, methylene, isopropylidene, or another difunctional organic residue containing 5 to 15 carbon atoms and a number of carbon atoms which is at most equal to the number of carbon atoms in said residue;
said polyarylene ether having a reduced viscosity, $\eta_{sp/c}$, of at least 0.25 dl/g.

2. A polyarylene ether as in claim 1 wherein Ar is phenylene, naphthalene, or

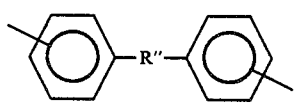

wherein
R'' is a covalent single bond, sulfur, sulfonyl, carbonyl, methylene, or isopropylidene.

3. A polyarylene ether as in claim 1 wherein adjacent R's represent a covalent single bond or oxygen.

4. A polyarylene ether as in claim 1 wherein R is hydrogen and q is 1.

5. A polyarylene ether as in claim 4 wherein Ar is phenylene and m has a value from 1 to 10.

6. A polyarylene ether as in claim 4 wherein Ar is m is 1, and R'' is a covalent single bond, sulfonyl, carbonyl, or isopropylidene.

7. A polyarylene ether as in claim 4 wherein Ar is and R'' is a difunctional organic residue containing 5 to 15 carbon atoms and a number of hydrogen atoms which is at most equal to the number of carbon atoms in said residue.

8. A method for making a polyarylene ether as in claim 1 wherein m is 0, which method comprises polycondensing a difunctional phosphine or phosphine oxide of the formula

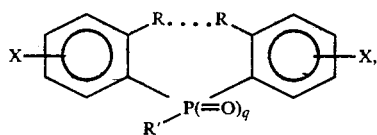

wherein one-half of group X are fluorine and one-half are hydroxyl, at an elevated temperature in the presence of an amount of an alkali which is equivalent to at least one-half the X groups.

9. A method for making a compound as in claim 1 wherein m has a value greater than 0, which method comprises polycondensing a mixture of a difunctional phosphine or phosphine oxide of the formula

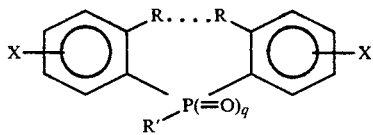

and a compound of the formula

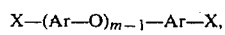

wherein one-half of group X are fluorine and one-half are hydroxyl, at an elevated temperature in the presence of an amount of an alkali which is equivalent to at least one-half the X grups.

10. A method as in claim 9 wherein the compounds polycondensed are symmetrical with respect to the X groups.

11. A method as in claim 8 wherein a phosphine or phosphine oxide wherein both X are F is polycondensed with a phosphine or phosphine oxide wherein both X are OH.

12. A method as in claim 9 wherein a phosphine or phosphine oxide wherein both X are F is reacted with a compound of the formula

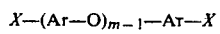

wherein both X are hydroxyl.

13. A polyarylene ether as in claim 1 containing phosphorus and having the structure

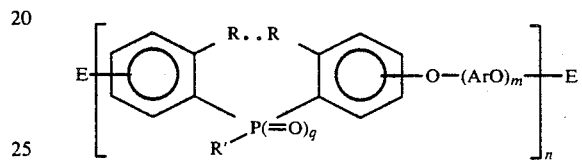

wherein
E is the same or different terminal group and is hydrogen, halogen, alkyl, aryl, alkoxyl, alkoyl, or oxyalkoyl;
n has an average value of at least 10.

* * * * *